United States Patent [19]
Snider et al.

[11] Patent Number: 5,861,689
[45] Date of Patent: Jan. 19, 1999

[54] LEADLESS MOTOR CONSTRUCTION

[75] Inventors: S. Duke Snider, Creve Coeur; John E. King, Florissant; Patrick M. Jones, St. Louis, all of Mo.

[73] Assignee: Emerson Electric Co., St. Louis, Mo.

[21] Appl. No.: 934,043

[22] Filed: Sep. 19, 1997

Related U.S. Application Data

[63] Continuation of Ser. No. 654,718, May 29, 1996, abandoned.

[51] Int. Cl.⁶ .............................. H02K 11/00; H02K 5/22
[52] U.S. Cl. ................................... 310/71; 310/89
[58] Field of Search ...................... 310/71, 89; 439/248, 439/384, 557, 926

[56] References Cited

U.S. PATENT DOCUMENTS

| | | | |
|---|---|---|---|
| 3,012,159 | 12/1961 | Druesedow | 310/71 |
| 3,813,567 | 5/1974 | Schmuck | 310/50 |
| 3,983,428 | 9/1976 | Bitsch et al. | 310/71 |
| 4,209,722 | 6/1980 | Peachee, Jr. | 310/90 |
| 4,245,870 | 1/1981 | Punshon et al. | 310/90 |
| 4,499,661 | 2/1985 | Peachee, Jr. | 29/596 |
| 4,656,378 | 4/1987 | Atherton et al. | 310/71 |
| 4,662,699 | 5/1987 | Vachhani et al. | 439/395 |
| 4,803,136 | 2/1989 | Bowsky et al. | 429/56 |
| 4,851,725 | 7/1989 | Keck | 310/71 |
| 4,894,571 | 1/1990 | Hildebrandt et al. | 310/71 |
| 5,015,894 | 5/1991 | Crow et al. | 310/71 |
| 5,131,867 | 7/1992 | Peloza et al. | 439/384 |
| 5,279,907 | 1/1994 | Paterek et al. | 429/56 |

FOREIGN PATENT DOCUMENTS

| | | | |
|---|---|---|---|
| 727238 | 2/1966 | Canada | 310/71 |
| 1960017 | 6/1971 | Germany | 310/71 |
| 2-285944 | 11/1990 | Japan | 310/71 |

OTHER PUBLICATIONS

Attachment A.

*Primary Examiner*—Clayton E. LaBalle
*Attorney, Agent, or Firm*—Polster, Lieder, Woodruff & Lucchesi

[57] ABSTRACT

A dynamoelectric machine is provided with improved connection structure which does not require external leads and which provides an integral ground connection for the dynamoelectric machine. The dynamoelectric machine is a motor, which includes a stator assembly, having a motor winding which is terminated at the winding ends with quick connected terminals. The motor includes at least one end shield. A terminal receptacle is designed to mount internally of the motor endshield. The terminal receptacle includes provisions for holding the ground terminal positionally, and is provided with a spring loading mechanism for loading the receptacle against the endshield. The terminal receptacle has an external latch which receives an associated terminal block in locking arrangement, normally being accompanied with an audible signal. The receptacle preferably is color coded to give a visual indication as to motor rating or identifying different motor types, for example.

27 Claims, 4 Drawing Sheets

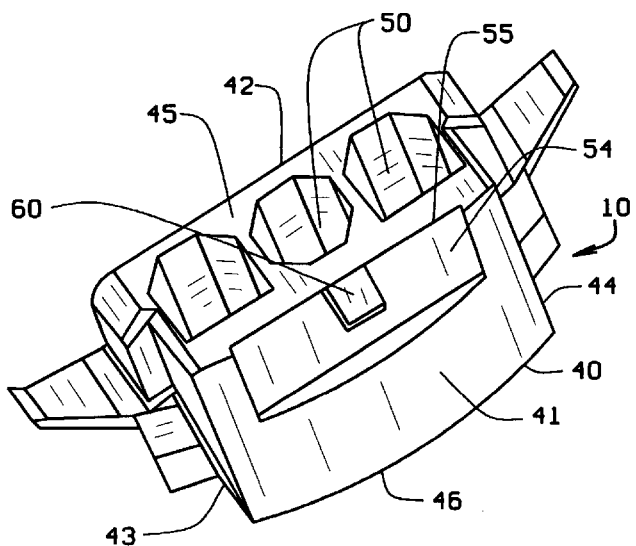
FIG. 5
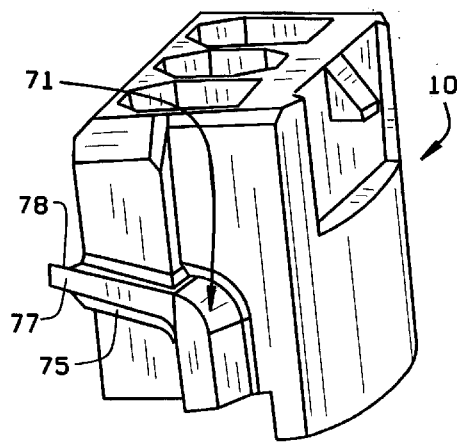
FIG. 6
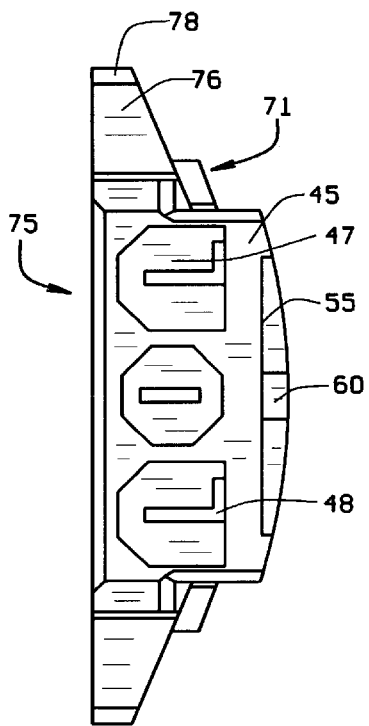
FIG. 7
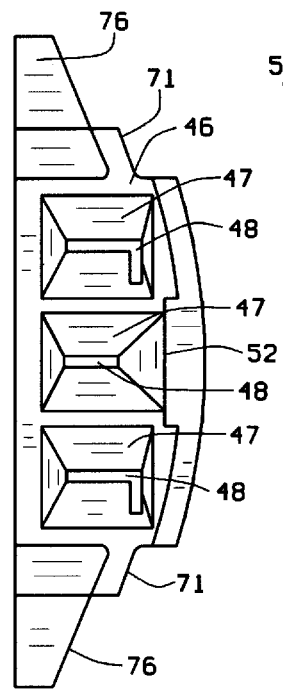
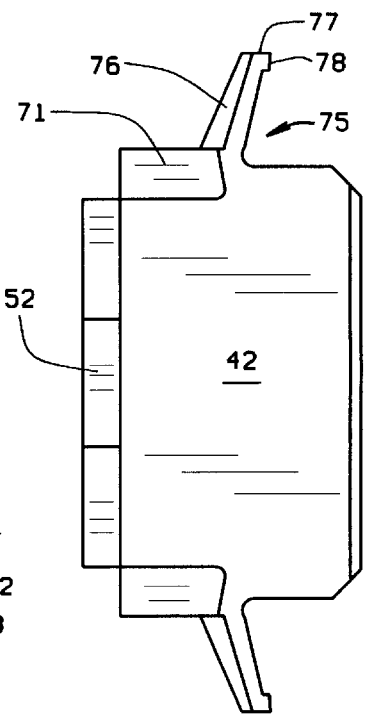
FIG. 9
FIG. 8

LEADLESS MOTOR CONSTRUCTION

This is a continuation of application Ser. No. 08/654,718, filed May 29, 1996 now abandoned.

BACKGROUND OF THE INVENTION

This invention relates to dynamoelectric machines and more particularly, to a leadless electric motor. While the invention is described with a particular reference to a unit bearing, shaded pole ac induction motor, those skilled in the art will recognize the wider applicability of the inventive principles disclosed hereinafter.

Dynamoelectric machines, particularly, both ac and dc motors, commonly include a core formed from a plurality of individual laminations. The core has winding receiving slots formed in it, and a winding is positioned on the core along the slots. The physical ends of the windings commonly are connected to internal electrical leads, which in the past have been brought externally of the motor. The leads are used to connect the motor to a source of external electrical energy. More recently, motor manufacturing efforts have been directed toward developing leadless motors. An example of such construction is shown in U.S. Pat. No. 5,015,894, issued May 14, 1991, and assigned to the assignee of the present invention. The disclosure of the 5,015,894 patent is intended to be incorporated herein by reference. As pointed out in that patent, electrical leads and their interconnection add cost to the motor. Among other reasons for such added cost is the fact that leads inhibit automation of the motor manufacturing process. Elimination of leads would facilitate automation and reduce manufacturing costs. Leadless motors also are more easily shipped, and the ability to simplify the shipping process also leads to reduced costs.

Unit bearing motors also are well known in the art. Specific reference to their construction may be found, for example, in U.S. Pat. Nos. 4,209,722 and 4,499,661, the disclosures of which are intended to be incorporated herein by reference. Both patents are assigned to the assignee of the present invention. Unit bearing motors are widely used in a number of condenser fan applications, having become ubiquitous in such applications as refrigerators and small room air conditioners.

Because of their wide acceptance in commercial products, certain safety features are required in the motor design. These features include, for example, a ground connection for the motor. Incorporating a ground connection easily in the receptacle design so as to permit automation of the motor manufacturing process is a continuing problem for motor manufacturers.

In addition, because the motor is leadless, and intended for application by original equipment manufacturers' personnel, the receptacle must be designed for foolproof installation of the power leads for the motor. Another problem facing motor manufacturers is the ability easily to color code the motor so that various ratings or motor types may be visually apparent to an OEM. Our invention overcomes these leadless prior art difficulties with a simply constructed, easily automated motor construction.

SUMMARY OF THE INVENTION

One of the objects of this invention is to provide an improved leadless motor design.

Another object of this invention is to provide a leadless motor design which is readily automated to reduce motor costs.

Another object of this invention is to provide a terminal receptacle intermountable in the motor with terminal connections extending from the motor terminating in the receptacle.

Another object of this invention is to provide a terminal intermountable with a terminal receptacle which provides automatic motor grounding capabilities.

Another object of this invention is to provide a receptacle structure which is spring loaded with respect to the associated motor components where the receptacle finds application.

Yet another object of this invention is to provide a terminal receptacle which may be color coded to provide information to an intended user.

Another object of this invention is to provide a terminal receptacle which includes a locking feature for an associated terminal block, the structure of which provides an audible signal to the user upon proper connection.

Another object of this invention is to provide a receptacle receiving the terminals of a stator assembly which prevents incorrect connection to a source of external power.

Other objects of this invention will be apparent to those skilled in the art in light of the following description and accompanying drawings.

In accordance with this invention, generally stated, a dynamoelectric machine is provided with simplified construction featuring automatic electrical grounding capabilities with no external leads. The preferred embodiment is a unit bearing motor which includes a stator assembly, the stator assembly being formed from a core of ferromagnetic material, electrical insulation on the core, and a motor winding carried by the core. The insulation is provided with winding turn end wire receiving structures adapted to receive the end of the windings and to permit automatic electrical attachment thereof to suitable electrical terminals. The core has at least one slot formed in it, the slot being sized to receive one end of a ground terminal. A receptacle block receives the terminals in polarity coded silos. The receptacle block includes a spring structure adapted to bias the receptacle into stator assembly engagement. The receptacle block includes a structure for supporting the ground terminal. The receptacle has a plurality of silos formed in it, which receive the terminals along one end thereof, and receive a connector block in a second end. The mating terminal block has a plurality of male barrels formed to be complementary to and received by the receptacle silos. The terminal block has a latch associated with it, which engages a latch formed along the receptacle, engagement occurring in a click-lock manner, so as to provide an audible signal to a user. At least the receptacle preferably is color coded.

BRIEF DESCRIPTION OF THE DRAWINGS

In the drawings.

FIG. 5 is view in perspective of one illustrative embodiment of a receptacle for providing leadless construction for the dynamoelectric machine of FIG. 1;

FIG. 6 is a side view in perspective of the receptacle of FIG. 5.;

FIG. 7 is a view in front elevation thereof;

FIG. 8 is a rear elevational view of the receptacle shown in FIG. 5;

FIG. 9 is a bottom plan view thereof;

DESCRIPTION OF THE PREFERRED EMBODIMENT

Figure 1:
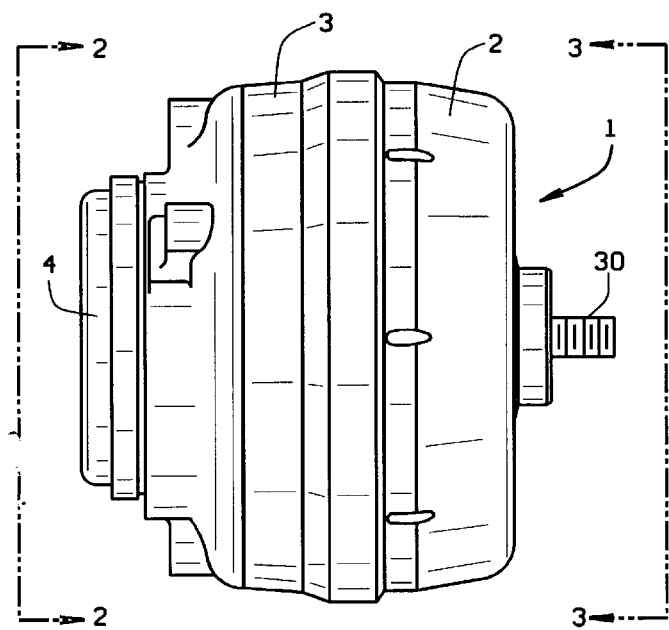
FIG. 1 is a view in side elevation of a dynamoelectric machine employing one illustrative embodiment of a receptacle block of the present invention to provide a leadless motor construction.
Figure 3:
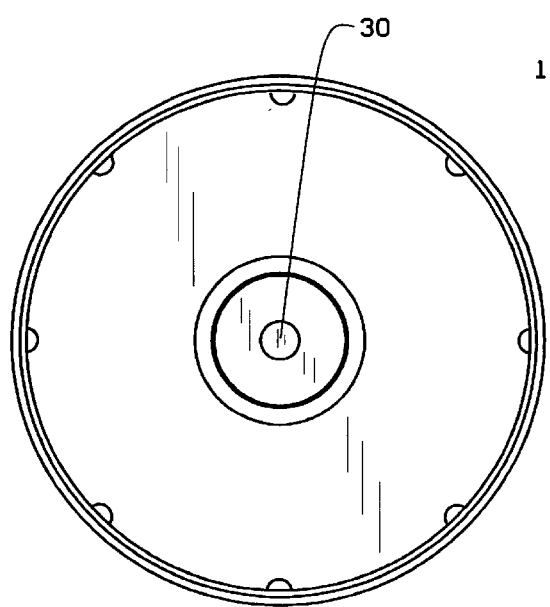
FIG. 3 is a view in end elevation, taken along the line 3—3 of FIG. 1.

Referring now to FIG. 1, reference numeral 1 indicates one illustrative embodiment of a dynamoelectric machine in the form of an electric motor. In the embodiment illustrated, the motor 1 is a unit bearing motor and includes an enclosure 2 having a rotor shaft 30 extending from it. The enclosure 2 is closed on one end by an endshield 3 which houses the unit bearing structure, the enclosure 2 being closed by an end cap 4. In the embodiment illustrated, the endshield 3 has an opening 5 formed in it, and the receptacle 10 of the present invention is accessible externally of the motor 1 at the opening 5.

Figure 4:
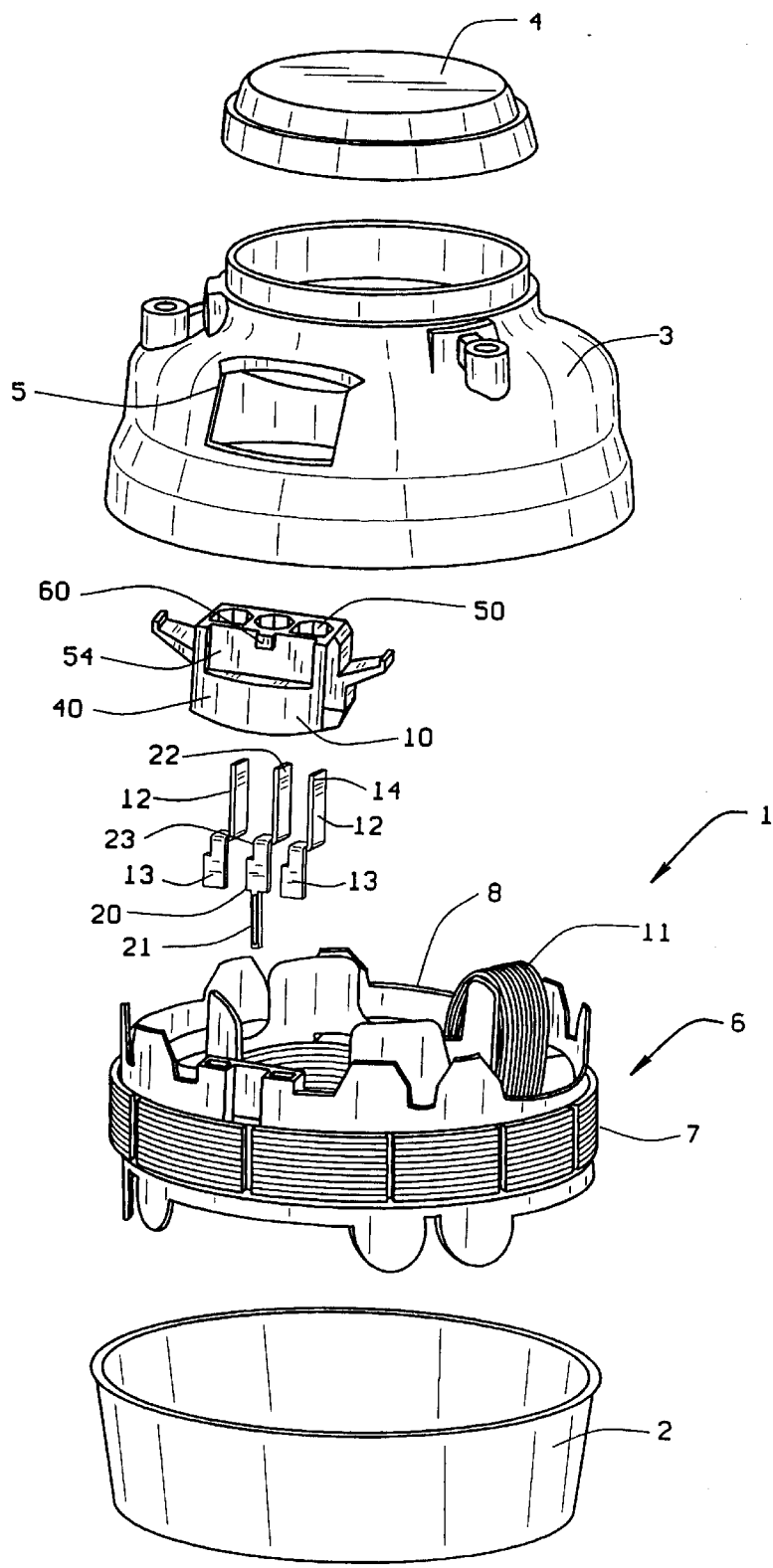
FIG. 4 is an exploded view illustrating the motor assembly of the present invention.

The parts just described are shown in an exploded view in FIG. 4. Referring now to that figure, the motor 1 includes a stator assembly 6. Stator assembly 6 includes a core 7 which preferable is constructed from a plurality of individual laminations and assembled into a predetermined core stack height, all as is well known in the art. The core 7 has an insulation system 8 associated with it. The insulation system 8 in the embodiment illustrated, is a molded in place insulation arrangement. Those skilled in the art will recognize that while the insulation 8 is described as molded in place on the core, the insulation system may be molded separately from the core and later placed on the core, if desired. In addition, other forms of insulation systems are compatible with the broader aspects of this invention.

Figure 10:
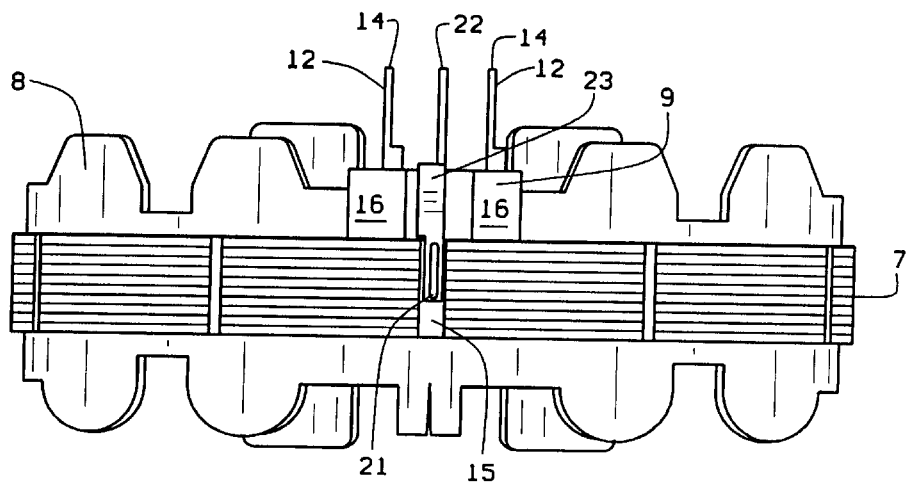
FIG. 10 is a view in side elevation of one illustrative embodiment of a stator assembly illustrating the terminal ground technique employed with the leadless motor of the present invention.

The insulation system 8 of the present invention includes a connection area 9, best seen in FIG. 10 and later described in greater detail. The stator assembly 6 further includes a winding 11 which has at least a first end and a second end which are positioned during the motor manufacturing procedure along the connection area 9 of the insulation system 8 along suitable formed pockets 16. The ends of the winding 11 are designed to be automatically interconnected with a pair of terminals 12. The terminals 12 are available from a number of manufacturers, and any suitable construction may be used. We preferably employ terminals sold under the trademark "MAG-MATE" although, again, other terminal types are compatible with the broader aspects of our invention. In any event, the terminals 12 are frictionally held by the insulation system 8 along the pockets 16 at the connection area 9 and automatically engage the end termination of the winding 11 during the motor manufacturing process. Each of the terminals 12 has a winding engaging end 13 and a connection end 14. The terminals 12 may have any of a plurality of design silhouettes which enable the terminals to accomplish the interconnection feature required.

A ground terminal 20 also is provided. The ground terminal 20 includes a ground end 21 and a connection end 22. The core 7 has at least one slot 15 formed in it which is intended to be positioned near the connection area 9 of the insulation system 8, best observed in FIG. 10. At least the terminal 20 has an offset portion 23 which allows the ground end 21 of the terminal 20 to extend radially outwardly of the insulation system 8 and engage the core 7 along the slot 15 in a tight friction fit. As indicated above, the terminals 12 are received in the pockets 16 formed along the connection area 9. No pocket is formed along the connection area 9 in the vicinity of the terminal 20, the terminal 20 design arrangement, again, being adapted to permit the terminal 20 to extend radially outwardly of the insulative system 8 so as to permit the end 21 to engage the core 7.

The terminals 12 and 20 are received in the receptacle 10 during the motor manufacturing process. The receptacle 10 is best observed in FIGS. 5–9. As there shown, the receptacle 10 includes a body 40 which is generally rectangular in design silhouette, the body 40 including a top wall 41, a bottom wall 42, side walls 43 and 44, a front face 45, and a back face 46.

The receptacle 10 preferably is a molded plastic part. Because of its type of construction, we provide coding for the receptacle, in that the receptacle 10 may assume a variety of colors. This is a particularly useful feature of our invention in that the molded plastic from which the receptacle 10 is constructed may be color coded to give a visual indication to a user, for example, of motor rating or motor type, without requiring correlation of that information with other written material.

The body 40 has a plurality of silos 50 formed in it. The silos 50 are axially extending chambers opened at the front face 45 of the body 40, and generally closed by a series of walls 47 on the back face 46 of the body 40. Each of the walls 47 has a terminal receiving slot 48 formed in it, which receives the terminals 12 and 22 during the motor manufacturing process. As shown, the slots 48 may assume different design configurations in order to accommodate the respective terminals being used in or for any particular motor construction.

The back face 46 of the receptacle 10 also has a support 52 formed in it, the support 52 being adapted to engage the offset 23 of the terminal 20. That engagement supports the end 22 of the terminal 20 in the intermounted position of the receptacle. The support 52 stabilizes the terminal 20 in operational use, and holds the terminal 20 positionally in applicational use.

The top 41 of the receptacle 10 has a grooved portion 54 formed in it. The portion 54 has, at a forward end 55, a latch 60 formed in a forward end 55 of the groove 54. Latch 60 is intended to engage a terminal block 70 as later described in greater detail.

As observable in FIG. 4, the opening 5 in the endshield 3 follows the contour of the endshield. The receptacle 10 also has its sides 43 and 44 configured to permit it to follow the contour of the endshield 3. To accomplish that end, the receptacle has contour conforming structure 71 along the respective side walls 43 and 44, the structure 71 being configured generally to conform to the opening 5 in the end wall. As will be appreciated by those skilled in the art, the configuration of any particular contour structure 71 depends on the endshield configuration, and the particular design of the walls is not described in detail, other than to observe in the drawings that the structure 71 enables the receptacle 10 to close the opening 5, giving the motor a finished appearance.

More importantly, however, is the arrangement employed in mounting the receptacle within enclosure 2. A spring structure 75 extends outwardly from the contour structure 71, along each of the sides 43 and 44 of the receptacle 10. Spring structure 75 includes an outwardly projecting arm 76 and an upwardly projecting portion 77, and a face 78. The face 78 of the structure 75 abuts the endshield 3 in intermounted position of the receptacle 10. That abutment, and the action of the spring structure 75, are important in the overall operation of our invention. That is to say, spring structure 75 biases the receptacle 10 towards the stator assembly 6, and ensures that tolerance variations that may occur during motor construction are accounted for by the spring operation of structure 75. That is, tolerance variation may make the placement of the receptacle 10 in the opening 5 impermissibly loose so that the receptacle 10 operation is impeded in application use. For example, without use of the spring 75, the receptacle 10 may cock or become misaligned within the opening 5. The spring 75 ensures that the receptacle 10 is positively biased between the endshield 3 and the stator assembly 6, enabling the receptacle 10 to maintain its position properly within the opening 5, and to provide support to the ground terminal 22 discussed above.

Figure 11:
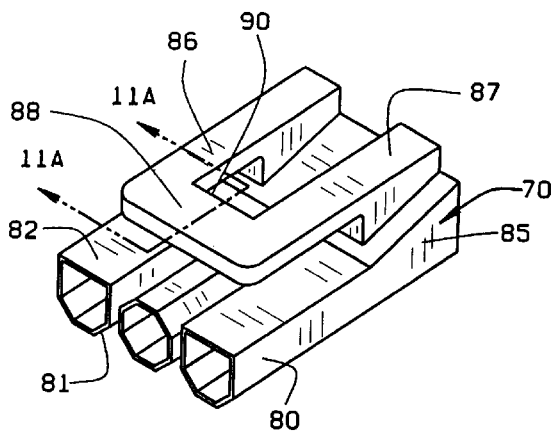
FIG. 11 is a perspective view of one illustrative embodiment of a terminal block employed with the receptacle of the present invention.

Terminal block 70 is best observed in FIG. 11. The terminal block 70 includes a base portion 85 having a plurality of barrels 80, 81, and 82 extending outwardly from it. The barrels 80–82 are designed to receive female electrical connectors, not shown, which are fixed to external power leads 85. The barrels 80, 81, and 82 have a design silhouette complementary to but diametrically smaller than the silos 80, permitting the silos to accept the barrels, and permitting the female electrical connectors to receive the respective terminals 12 and 20 in a conventional manner.

The base 85 has a pair of cantilevered arms 86 and 87 spaced from and extending outwardly from it. The arms 86 and 87 are joined to one another by a latch portion 88. The action between latch portion 88 and latch 60 provides the locking feature of our invention.

Figure 11A:
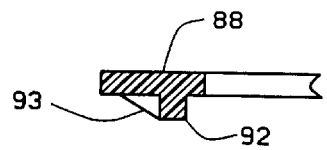
FIG. 11a is a fragmentary sectional view taken along the line A—A of FIG. 11.
Figure 12:
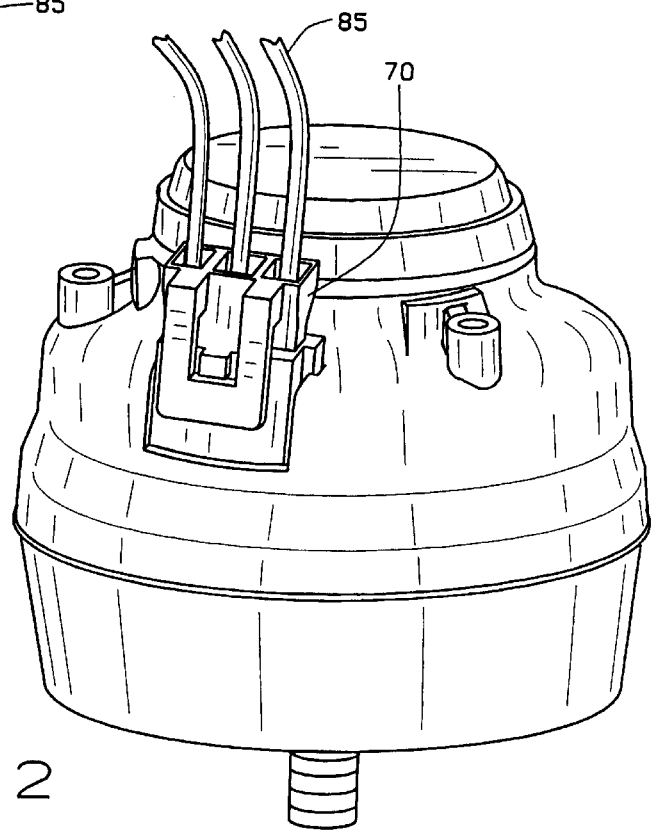
FIG. 12 is a view in perspective illustrating the leadless motor of the present invention adapted for connection to a source of external power, the power leads being shown broken away.

The construction of the latch portion 88 may vary in embodiments of the invention. That is to say, the latch portion 88 may employ a rear edge 90 to engage the latch 60 of the receptacle 10. In the alternative, some form of complementary rib, as shown in FIG. 11A, for example, may be positioned on the latch portion 88 to engage the latch 60 in the intermounted position of the receptacle 10 and terminal block 70. If desired, a suitable lead in 93 may be provided to aid in interconnecting the projection 92 in the latch 60. The cantilever arrangement of the arms 86 and 87 means that the arms may be moved easily by finger pressure. It also means that interconnection of either the edge 90 or the projection 92 with the latch 60 provides an audible signal to an assembler after or as that interconnection is made. That interconnection position of the receptacle 10 and block 70 is illustrated in FIG. 12.

As will be appreciated by those skilled in the art, terminal block 70 often is provided by the OEM customer to whom the motor 1 is sold. That means that the motor, which is leadless both internally and externally, is easier to manufacture and easier to ship, resulting in lower cost motor design.

Figure 2:
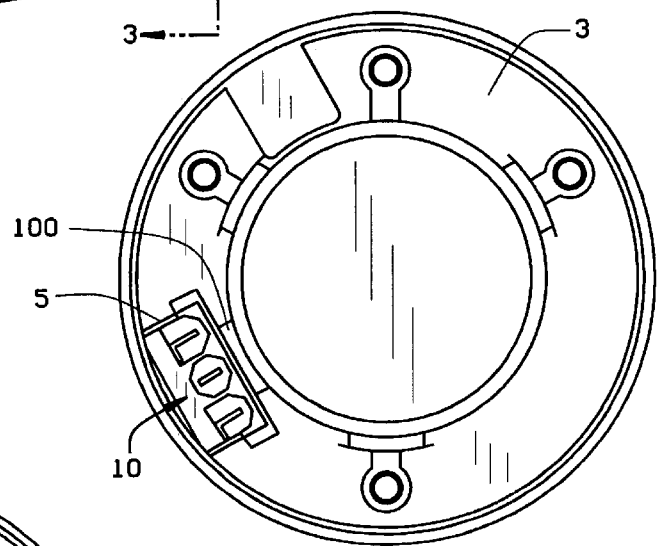
FIG. 2 is a view in end elevation, taken along the line 2—2 of FIG. 1.

Numerous variations, within the scope of the appended claims, will be apparent to those skilled in the art in view of the foregoing description and accompanying drawings. As indicated, the motor type may vary in other embodiments of the invention. While the receptacle 10 was indicated as being associated with the endshield portion of the motor, the receptacle may be employed with either the endshield or the shell (or other enclosure), if desired. Likewise, while the silo and barrels of the receptacle and terminal block provide one form of polarity check, we also find it convenient to use a stop 100 to ensure proper connection of the motor. The stop 100 is best seen in FIG. 2. As there shown, stop 100 is a raised projection on the endshield 3, positioned generally centrally with respect to the opening 5. Consequently, if one were to invert the terminal block for insertion in receptacle 10, the latch part 80 of the terminal block 70 would strike the stop 100, preventing the connection of the terminal block 70 and the receptacle 10. As indicated in the drawings, the receptacle 10 and its component parts all are molded integrally with one another. If desired, the component parts may be formed separately and later interconnected. Those skilled in the art also will recognize that it is possible for the receptacle 10 to be formed at one time as a part of the endshield 3, thus combining the receptacle and endshield into a single part.

From the foregoing, it is apparent that a novel motor construction is disclosed for accomplishing the objectives set forth above, as well as others, and that changes in the precise arrangement, shape and details, in addition to or in place of those previously described, may be made by those skilled in the art without departing from the scope of our invention. From the foregoing, it is apparent the variations described are merely illustrative.

Having thus described the invention, what is desired to be secured by Letters Patent is:

1. A dynamoelectric machine having no external leads comprising:

an enclosure;

a stator assembly including a stator core, insulation on said core, and a winding carried by said core, said winding having at least one end termination, said stator core having at least one slot formed therein;

at least two terminals, one of said terminals being adapted for connection to an end termination of said winding, the other of said terminals having a first end in electrical contact with said core and a second end providing a ground terminal for said dynamoelectric machine, said slot in said stator core being sized to receive the first end of the terminal therein; and a terminal receptacle adapted to receive said terminals, said receptacle being mounted on said enclosure and having a spring associated with it for biasing said receptacle toward said core.

2. The dynamoelectric machine of claim 1 wherein said receptacle has a plurality of silos, said silos receiving said terminals, said silos having differently shaped internal configurations.

3. The dynamoelectric machine of claim 2 wherein said receptacle includes a support for holding said ground terminal positionally with respect to said core.

4. The dynamoelectric machine of claim 3 farther including a latch formed on an external surface of said receptacle.

5. The dynamoelectric machine of claim 4 further including a terminal block intermountable with said receptacle, said terminal block including a locking assembly, said locking assembly including an arm at least partially engageable with said latch, said engagement providing an audible indication to a user.

6. The dynamoelectric machine of claim 5 wherein said receptacle has an external design silhouette at least partially complementary to the dynamoelectric machine enclosure.

7. The dynamoelectric machine of claim 6 further including at least one endshield, said endshield having an opening formed in it, said receptacle being positioned in the opening of said endshield.

8. The dynamoelectric machine of claim 7 further including a stop integrally formed with said endshield and a position adjacent said opening.

9. The dynamoelectric machine of claim 8 wherein said spring comprises a spring arm position between said receptacle and said endshield.

10. The dynamoelectric machine of claim 9 wherein said spring arm is integrally molded with said receptacle.

11. The dynamoelectric machine of claim 10 wherein said receptacle is color coded to provide a visual indication to a user.

12. A leadless motor comprising:

an enclosure;

a stator assembly in said enclosure, said stator assembly including a core having at least one slot formed therein, insulation on said core, and a winding carried by said core, said winding having at least a first end and a second end;

a plurality of terminals, one each of said terminals being electrically connected to respective ones of said first and said second winding ends, and a third terminal having a first end positioned in said slot and electrically connected to said core;

a receptacle for receiving all of said terminals, said receptacle being positioned at least partially within said enclosure; and a spring for biasing said receptacle between said enclosure and said stator assembly.

13. The leadless motor of claim 12 wherein said third terminal frictionally engages said core along said slot.

14. The leadless motor of claim 12 wherein said third terminal includes an offset portion that allows the first end to extend radially outwardly from said insulation to engage said core along said slot.

15. The leadless motor of claim 14 wherein said receptacle includes a support for supporting and holding said offset portion with respect to said stator assembly.

16. A leadless motor comprising:

an enclosure;

a stator assembly within said enclosure, said stator assembly including a core having at least one slot formed therein, and a winding carried by said core having at least a first end and a second end;

a plurality of terminals, one each of said terminals being electrically connected to respective ends of said winding, and a third terminal having a first end electrically connected to said stator assembly along said slot;

a receptacle for receiving said terminal plurality, said receptacle being mounted on and positioned at least partly within said enclosure, said receptacle including a support for supporting and holding said third terminal with respect to said slot.

17. A dynamoelectric machine comprising:

an enclosure;

a stator assembly in said enclosure, said stator assembly including a core formed from ferromagnetic material having at least one slot formed therein, an insulation system positioned on said core, a winding carried by said core, a plurality of terminals associated with said insulation system, said insulation system holding said terminals and facilitating the connection of said terminals to said winding; and a receptacle mounted on and at least partially positioned internally of said enclosure and being accessible externally of said dynamoelectric machine, said receptacle being positioned to receive said terminals, at least one of said terminals having a first end in electrical contact with said stator core along said slot and a second end in said receptacle so as to provide a ground for said dynamoelectric machine.

18. The dynamoelectric machine of claim 17, wherein said receptacle includes a support for holding said ground terminal positionally with respect to said core.

19. The dynamoelectric machine of claim 18, wherein said receptacle has a plurality of silos associated with it, said silos receiving said terminals, at least two of said silos having differently shaped configurations.

20. The dynamoelectric machine of claim 19, further including a latch formed on an external surface of said receptacle.

21. The dynamoelectric machine of claim 20, further including a terminal block intermountable with said receptacle, said terminal block including a locking assembly, said locking assembly including an arm for engaging said latch, such engagement providing an audible indication to a user.

22. The dynamoelectric machine of claim 21, wherein said receptacle has an external design silhouette at least partially complementary to the dynamoelectric machine enclosure.

23. The dynamoelectric machine of claim 22, wherein said receptacle includes at least one spring biasing said receptacle between said enclosure and said stator assembly.

24. The dynamoelectric machine of claim 23, wherein said enclosure includes at least one endshield, said endshield having an opening formed in it, said receptacle being positioned in the opening in said endshield.

25. The dynamoelectric machine of claim 24, wherein said spring comprises a spring arm positioned between said receptacle and said endshield.

26. The dynamoelectric machine of claim 25, wherein said spring arm is molded with said receptacle.

27. The dynamoelectric machine of claim 26, wherein said receptacle has a color included in its formulation to provide a visual indication to a user.

* * * * *